US006110574A

United States Patent [19]

Ochi et al.

[11] Patent Number: 6,110,574

[45] Date of Patent: Aug. 29, 2000

[54] RETROREFLECTIVE SHEETING

[75] Inventors: Katsura Ochi, Kazo; Osamu Tanaka; Masaki Yoshizawa, both of Sano, all of Japan

[73] Assignee: Nippin Carribe Kogyo Kabushiki Kaisha, Tokyo, Japan

[21] Appl. No.: 08/894,064

[22] PCT Filed: Dec. 12, 1995

[86] PCT No.: PCT/JP95/02538

§ 371 Date: Aug. 12, 1997

§ 102(e) Date: Aug. 12, 1997

[87] PCT Pub. No.: WO97/22098

PCT Pub. Date: Jun. 19, 1997

[51] Int. Cl.[7] .......................... B32B 27/00; B32B 27/08; B32B 27/30

[52] U.S. Cl. .......................... 428/220; 428/334; 428/335; 428/336; 428/355 AC; 428/421; 428/522

[58] Field of Search .................................... 428/421, 422, 428/214, 215, 334, 335, 336, 355 AC, 220, 522

[56] References Cited

U.S. PATENT DOCUMENTS

| | | | |
|---|---|---|---|
| 3,417,959 | 12/1968 | Schultz | 249/117 |
| 3,712,706 | 1/1973 | Stamm | 359/531 |
| 4,025,674 | 5/1977 | Mizuochi | 428/29 |
| 4,653,854 | 3/1987 | Miyata | 359/514 |
| 5,234,524 | 8/1993 | Ozu et al. | 156/327 |
| 5,399,418 | 3/1995 | Hartmanns et al. | 428/218 |
| 5,812,316 | 9/1998 | Ochi et al. | 359/530 |

OTHER PUBLICATIONS

Mark et al., Encyclopedia of Polymer Science, vol. 15, pp. 563–567, Oct. 1989.

*Primary Examiner*—Paul Thibodeau
*Assistant Examiner*—Ramsey Zacharia

[57] ABSTRACT

The present invention provides a retroreflective sheeting comprising:

a base retroreflective sheeting having a flat front face layer at the light-incident side, and a fluorine-contained resin film having a total light transmittance of at least 80%, laminated on the flat front face layer of the base retroreflective sheeting via an adhesive layer.

This retroreflective sheeting is low in extent of freezing or snow sticking on the surface when used in cold districts, and shows excellent stain removability even for the stain made on the surface by mischief with a paint, an ink or the like.

23 Claims, No Drawings

RETROREFLECTIVE SHEETING

CROSS-REFERENCE TO RELATED APPLICATIONS

This application is the National Phase U.S. application of International PCT Application PCT/JP95/02538, filed Dec. 12, 1995.

TECHNICAL FIELD

The present invention relates to a retroreflective sheeting which is useful for use in signs (e.g. road signs and construction signs), number plates on vehicles such as automobiles and motor cycles, safety goods (e.g. safety cloth and survival equipment), sporting goods (e.g. snow pole), marking materials (e.g. signboards), etc., which is low in extent of freezing or snow sticking on the surface when used particularly in cold districts, and which, even when the surface is stained with a paint, an ink or the like, has excellent stain removability (that is, the stain can be easily removed only by wiping with dry cloth or water washing, without using any organic solvent or the like).

BACKGROUND ART

Retroreflective sheetings, which retroreflect a light incident thereon, towards the light source, have heretofore been well known and, for their retroreflecting property, have been widely used in the above-mentioned application fields.

These conventional retroreflective sheetings, however, have various problems when used particularly in cold districts. For example, when the atmospheric temperature falls below 0° C., the waterdrops adhering on the surface of retroreflective sheeting freeze, resulting in reduced retroreflecting property of the sheeting; and, when there is snowfall, snow adheres on the surface of retroreflective sheeting and, in an extreme case, the retroreflective sheeting may completely lose the display function of sign. Thus, there have often occurred, in cold districts, troubles such as reduction in visibility or retroreflecting property of retroreflective sheeting, caused by ice, snow or the like.

Various attempts have heretofore been made for prevention of the above-mentioned freezing or snow sticking of retroreflective sheeting in cold districts. For example, U.S. Pat. No. 5,087,508 discloses a method of fitting, to a sign, a heat-storing substance to prevent the freezing or snow sticking of the sign by utilization of the heat stored in the substance. This method, however, has such problems as the fitting of the heat-storing substance to a sign is troublesome and needs an additional cost. Therefore, the method is very difficult to put into wide practical application.

Recently, in addition, there have occurred troubles (problems) that the surfaces of, in particular, signs such as road signs and construction signs are stained, by mischief, with a paint, an ink or the like, resulting in reduced display function of sign. Attempts have heretofore been made as well for recovery of the lost function of sign by removing the stain from the stained sign. For example, a method is in use which comprises coating, on the surface of a retroreflective sheeting, a solution of an acrylic crosslinking resin or the like, drying the resulting sheeting to form a solvent-resistant surface layer on the sheeting and, when the resulting sheeting is stained, wiping and removing the stain with an organic solvent. This method, however, has problems in that, in stain removal, a solvent capable of dissolving the stain must be used and this has adverse effects on operator's health and operational environment.

Furthermore, there is also known a so-called enclosed lens retroreflective sheeting obtained by using a fluorine-contained resin film as at least part of a retroreflective sheeting. For example, there is disclosed, in the gazette of Japanese Patent Application Laid-Open No. 86701/1992, a retroreflective sheeting of ultrahigh weatherability comprised of a surface layer made of a fluorine-contained resin film, laminating thereon a substantially mono-layer of glass beads of high refractive index and a focusing layer film in this order, and forming a metal layer on the focusing layer film.

According to the gazette, the above retroreflective sheeting of ultrahigh weatherability is produced by coating, on an appropriate supporting film, a coating composed mainly of a fluorine-contained resin solution, drying the resulting material to form a fluorine-contained resin surface layer, coating, on the surface layer, a coating to become a binder layer film, drying the resulting material to form a binder layer film, embedding glass beads in the binder layer film, coating thereon a coating to become a focusing layer film, drying the resulting material to form a focusing layer film, and forming a metal reflecting layer on the focusing layer film. It is also disclosed in the gazette that an intermediate layer may be formed between the surface layer and the binder layer in a similar manner.

However, many of low-surface tension resins such as fluorine-contained resin and the like have low solubility in organic solvents. In preparation of an organic solvent solution of such a resin, there are problems, for example, in that the range of selectable resins is narrow and care is needed in selection of organic solvent used. Thus, no truly satisfactory retroreflective sheeting is obtained at present.

The object of the present invention is to provide a retroreflective sheeting which is improved by simple operation so that the sheeting is endowed with freezing resistance and resistance to snow sticking and further that, even when the surface of an article (e.g. a sign) using the retroreflective sheeting is stained with a paint, an ink or the like, the stain can be easily removed only by wiping with dry cloth or water washing, without using any wiping solvent which gives adverse effects to human body or environment.

DISCLOSURE OF THE INVENTION

The present inventors made an extensive study on how to improve the freezing resistance and resistance to snow sticking of the surface of a retroreflective sheeting surface and the stain removability of the retroreflective sheeting. As a result, the present inventors found out that the freezing resistance, resistance to snow sticking and stain removability of a retroreflective sheeting can be significantly improved by a very simple operation of laminating, on the light-incident side surface of a retroreflective sheeting, a transparent fluorine-contained resin film via an adhesive layer.

According to the present invention, there is provided a retroreflective sheeting comprising:

- a base retroreflective sheeting having a flat front face layer at the light-incident side, and
- a fluorine-contained resin film having a total light transmittance of at least 80%, laminated on the flat front face layer of the base retroreflective sheeting via an adhesive layer.

The retroreflective sheeting of the present invention is hereinafter described in more detail.

The base retroreflective sheeting on which a fluorine-contained resin film is stuck according to the present invention, has no particular restriction as to its type as long as it has a flat front face at the light-incoming side. As the base sheeting, there can be used, for example, an enclosed lens retroreflective sheeting, an encapsulated lens retroreflective sheeting, an encapsulated cube-corner retroreflective sheeting and a metallized cube-corner retroreflective sheeting. These retroreflective sheetings and production processes thereof are described in Japanese Patent Publication No. 2921/1981 (U.S. Pat. No. 4,025,674) (enclosed lens retroreflective sheeting); Japanese Patent Application Laid-Open No. 194405/1985 (U.S. Pat. No. 4,653,854) (encapsulated lens retroreflective sheeting); U.S. Pat. No. 3,417,959 (encapsulated cube-corner retroreflective sheeting); and Japanese Patent Application Laid-Open No. 106839/1974 (U.S. Pat. No. 3,712,706), etc. (metallized cube-corner retroreflective sheeting). Herein, only citation of these gazette and specification is made and no specific explanation of each sheeting and production process thereof is made.

The present retroreflective sheeting is characterized in that a fluorine-contained resin film is stuck on the flat surface layer of the light-incoming side of the above-mentioned base retroreflective sheeting.

As the fluorine-contained resin film stuck, there is used a highly transparent fluorine-contained resin film having a total light transmittance of at least 80%, preferably at least 85%, more preferably at least 90%. In the present specification, the total light transmittance of fluorine-contained resin film is a value as measured by using "Haze Meter TC-H III" (a product of Tokyo Denshoku Co., Ltd.).

The thickness of the fluorine-contained resin film has no particular restriction and can be varied in a wide range depending upon, for example, the application of the retroreflective sheeting, but can be generally 1–100 μm, preferably 5–80 μm, more preferably 10–70 μm, further preferably 20–60 μm.

The fluorine-contained resin usable in production of such a film includes, for example, homopolymers of a fluoroolefin monomer (e.g. tetrafluoroethylene, chlorotrifluoroethylene, trifluoroethylene, vinylidene fluoride, vinyl fluoride or hexafluoropropylene), a fluorine-containing monomer other than fluoroolefin monomers [e.g. perfluoroalkyl vinyl ether or perfluoroalkyl (meth)acrylate] or the like; copolymers between these fluorine-containing monomers or between such fluorine-containing monomer(s) and other copolymerizable monomer(s); and a mixture of the above (co)polymer (s) and other resin.

As the other copolymerizable monomers, there can be mentioned, for example, olefin monomers such as ethylene, propylene and the like; (cyclo)alkyl vinyl ether monomers such as methyl vinyl ether, ethyl vinyl ether, n-butyl vinyl ether, cyclohexyl vinyl ether, cyclopentyl vinyl ether and the like; vinyl carboxylate monomers such as vinyl acetate, vinyl propionate, vinyl pivalate, Vinyl Versatate (trade name, a product of Shell), vinyl benzoate, vinyl p-tert-butylbenzoate, vinyl cyclohexanecarboxylate, isopropenyl acetate and the like; vinyl halide monomers other than fluorine-containing monomers, such as vinyl chloride, vinylidene chloride and the like; (meth)acrylic acid ester monomers such as methyl (meth)acrylate, ethyl (meth) acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, n-octyl (meth) acrylate, isooctyl (meth)acrylate, n-nonyl (meth)acrylate, isononyl (meth)acrylate, lauryl (meth)acrylate and the like; hydroxyl group-containing monomers such as 2-hydroxyethyl vinyl ether, 3-hydroxypropyl vinyl ether, 4-hydroxybutyl vinyl ether, 2-hydroxyethyl allyl ether, 2-hydroxyethyl (meth)acrylate and the like; carboxyl group-containing monomers such as acrylic acid, methacrylic acid and the like; amino group-containing monomers such as N,N-dimethylaminoethyl (meth)acrylate, N,N-diethylaminoethyl (meth)acrylate, N,N-diethylaminoethyl vinyl ether and the like; epoxy group-containing monomers such as glycidyl vinyl ether, glycidyl (meth)acrylate and the like; hydrolyzable silyl group-containing monomers such as trimethoxyvinylsilane, triethoxyvinylsilane, 2-trimethoxysilylethyl vinyl ether, y-methacryloxypropyltrimethoxysilane and the like; siloxy group-containing monomers such as 2-trimethylsiloxyethyl vinyl ether, 4-trimethylsiloxybutyl vinyl ether and the like; and siloxycarbonyl group-containing monomers such as trimethylsilyl (meth)acrylate, vinyl 5-trimethylsiloxycarbonylpentanoate and the like.

These copolymerizable monomers can be used in such a proportion that the film produced from the fluorine-contained copolymer of such monomers has a surface tension of 40 dyne/cm or less, preferably 35 dyne/cm or less, more preferably 31 dyne/cm or less. Here, the surface tension of the film is a value obtained as follows.

In the case of a film having a surface tension of 31 dyne/cm or more, the film is coated, in a linear shape, with each of a plurality of wettability standard solutions for wettability test (products of Wako Pure Chemical Industries, Ltd.) having different surface tensions, in an atmosphere of 23° C. and 65% RH; after about 3 seconds, the extent of crawling is examined visually; and the surface tension of the film is determined by the No. of the standard solution which gives no crawling. In the case of a film having a surface tension of less than 31 dyne/cm, angle of contact is measured by the sessile drop method using a methanol/water mixture, whereby the surface tension of the film is determined.

The fluorine-contained resin preferably usable in the present invention includes, for example, a polytetrafluoroethylene, a tetrafluoroethylene/perfluoroalkyl vinyl ether copolymer, a tetrafluoroethylene/hexafluoropropylene copolymer, a tetrafluoroethylene/hexafluoropropylene/perfluoroalkyl vinyl ether copolymer, a tetrafluoroethylene/ethylene copolymer, a polychlorotrifluoroethylene, a chlorotrifluoroethylene/ethylene copolymer, a polyvinylidene fluoride and a polyvinyl fluoride.

There can also be used a mixture of such a fluoro(co) polymer and other resin. The other resin includes, for example, a polyacetal resin, a polycarbonate resin, a polyamide resin, a polystyrene resin, an acrylic resin, a vinyl acetate resin, a polyurethane resin, a phenolic resin and a polyimide resin.

The mixing proportion of the other resin can be such that the film produced from the resin mixture used has a surface tension of the above-mentioned range.

The fluorine-contained resin which can be used particularly preferably in the present invention, includes a tetrafluoroethylene/ethylene copolymer containing tetrafluoroethylene units in an amount of 15–85% by weight, preferably 25–75% by weight, more preferably 35–65% by weight, and a polyvinylidene fluoride. These (co)polymers desirably have a weight-average molecular weight of generally 5,000–400,000, particularly 7,000–300,000 in view of the processability, film durability, etc.

When there is used a mixture of the above-mentioned (co)polymer and the above-mentioned other resin, it is preferable that the proportion of the fluorine-contained (co) polymer is at least 70% by weight, particularly at least 80% by weight, more particularly at least 90% by weight based on the weight of the mixture.

The fluoroolefin units-containing (co)polymers which can be used in the present invention and are commercially available, include, for example, "Fluon", "Aflon TFE" and "Aflon COP" (these are products of Asahi Glass Go., Ltd.); "Polyflon TFE", "Neoflon FEP", "Neoflon PFA" and "Neoflon ETFE" (these are products of Daikin Industries, Ltd.); and "Teflon TFE", "Teflon FEP", "Teflon PFA", "Teflon EPE" and "Tefzel" (these are products of DuPont-Mitsui Fluorochemical Co., Ltd.).

The fluorine-contained resin used in the present invention may contain, as necessary, a heat stabilizer, a light stabilizer, a crosslinking agent, a coloring agent, etc. as long as the properties (e.g. total light transmittance and surface tension) of the fluorine-contained resin film are not substantially affected.

The above-mentioned fluorine-contained resin is processed into a film desirably by heat melt molding such as melt extrusion, calendering and the like.

According to the present invention, the thus-obtained fluorine-contained resin film is laminated and covered on the flat front face layer of the light-incoming side of a base retroreflective sheeting via an adhesive layer, preferably a pressure-sensitive adhesive layer. In this lamination, the adhesive may beforehand be coated on the to-be-stuck side of the fluorine-contained resin film, or may be coated on the flat front face layer of the base retroreflective sheeting; or, the adhesive may be coated on an appropriate release material and then transferred onto the to-be-stuck side of the fluorine-contained resin film or onto the flat front face layer of the base retroreflective sheeting.

The thickness of the thus-formed adhesive layer can be varied depending upon the kind of the adhesive used, and the thickness of the fluorine-contained resin film on which the adhesive is to be stuck, etc. However, the thickness can be generally 5–80 $\mu$m, preferably 10–70 $\mu$m, more preferably 20–60 $\mu$m.

The adhesive is preferably a pressure-sensitive adhesive composed mainly of a sticky resin having a glass transition temperature (Tg) of −100° C. to +50° C., particularly −80° C. to −20° C.

As the sticky resin, those used in conventional pressure-sensitive adhesives can be used as well. The sticky resin has no particular restriction as to the kind, and there can be used, for example, synthetic resins of acrylics, urethanes, ethylene-vinyl acetate copolymers, silicones, etc. Of these, acrylic resins are preferred.

As the acrylic resins, there can be mentioned, for example, those obtained by copolymerizing at least one $C_{2-12}$ alkyl ester of acrylic acid (monomer A) (e.g. ethyl acrylate, n-propyl acrylate, n-butyl acrylate, isobutyl acrylate, n-pentyl acrylate, 2-methylbutyl acrylate, n-hexyl acrylate, 2-ethylhexyl acrylate, n-octyl acrylate, isooctyl acrylate, n-nonyl acrylate and isononyl acrylate) and at least one functional group-containing acrylic monomer (monomer B) (e.g. acrylic acid, methacrylic acid, acrylamide, N-methylolacrylamide, 2-hydroxyethyl acrylate and 2-hydroxyethyl methacrylate), in such proportions that the resulting acrylic resin has a Tg of the above-mentioned range. The proportions of the monomer A and the monomer B copolymerized are preferably 99.5/0.5 to 70/30, particularly 99/1 to 75/25 in terms of the weight ratio of monomer A/monomer B.

As an acrylic resin particularly preferable as the sticky resin, there can be mentioned a copolymer obtained by copolymerizing butyl acrylate (BA) and acrylic acid (AA) in a BA/AA weight ratio of 99.1/0.9 to 70/30, particularly 99.5/0.5 to 80/20.

The sticky resin desirably contains an ultra-violet absorber and can further contain, as necessary, a photo-oxidation inhibitor, in order to improve the weatherability of the sticky resin per se and the weatherability of the base retroreflective sheeting used as a substrate for the sticky resin.

Preferred as the ultraviolet absorber usable in the sticky resin are those having a maximum absorption wavelength generally at 340–353 nm, particularly at 343–346 nm, for example, ultraviolet absorbers of cyanoacrylate type, benztriazole type, benzophenone type, salicylic acid type, hydroquinone type, etc. Of these, reactive ultraviolet absorbers may be introduced into the polymer by reacting with the polymer or by beforehand reacting with the above-mentioned monomers of the polymer.

As specific examples of the usable ultraviolet absorber, the followings can be mentioned. The benztriazole type ultraviolet absorbers include, for example, 2-(3,5-di-tert-butyl-2-hydroxyphenyl)benztriazole, 2-[2-hydroxy-3,5-bis($\alpha$,$\alpha$-dimethylbenzyl)phenyl]-2H-benztriazole and 2-(3,5-di-tert-amyl-2-hydroxyphenylbenztriazole; the benzophenone type ultraviolet absorbers include, for example, 2-hydroxy-4-octoxybenzophenone, 2,4-dihydroxybenzophenone and 2-hydroxy-4-methoxy-2'-carboxybenzophenone; the salicylic acid type ultraviolet absorbers include, for example, phenyl salicylate, p-octylphenyl salicylate, resorcinol monobenzoate and 4-tert-butylphenyl salicylate; and the cyanoacrylate type ultraviolet absorbers include, for example, ethyl-2-cyano-3,3-diphenyl acrylate and 2-ethylhexyl-2-cyano-3,3-diphenyl acrylate.

Of these, benztriazole type ultraviolet absorbers are particularly preferred.

The ultraviolet absorber can be used in an amount of generally 0.5–10 parts by weight, preferably 0.6–9 parts by weight, more preferably 0.7–8 parts by weight per 100 parts by weight (as solid content) of the sticky resin.

Desirably, the adhesive layer further contains a photo-oxidation inhibitor in addition to the above-mentioned ultraviolet absorber. As the photo-oxidation inhibitor usable, there can be mentioned, for example, photo-oxidation inhibitors of hindered amine type, hindered phenol type, etc. Of them, a hindered amine type photo-oxidation inhibitor is preferred.

The hindered amine type photo-oxidation inhibitor has no particular restriction as to the kind, but one having a high molecular weight and an N-substituted piperidinol nucleus can be cited as a generally preferred example. The hindered amine type photo-oxidation inhibitor preferably has a weight-average molecular weight of generally 400–10,000, particularly 500–5,000. As specific examples of such a hindered amine type photo-oxidation inhibitor, there can be mentioned esters (high-molecular esters) between butanetetracarboxylic acid and an N-substituted piperidinol, and there can be mentioned, as preferable examples, commercial products such as MARK LA-63 (trade name, a product of Adeka Argus Chemical Co., Ltd.), MARK LA-62 (trade name, a product of Adeka Argus Chemical Co., Ltd.), TINUVIN-622LD [trade name, a product of Ciba-Geigy (Japan) Limited] and the like. By using a high-molecular hindered amine type photo-oxidation inhibitor, bleed out can be prevented and, as a result, the properties of the retroreflective sheeting of the present invention can be maintained over a long period of time.

The amount of the photo-oxidation inhibitor used is not strictly restricted and can be varied depending upon the kind thereof, etc., but can be generally 0.5–5 parts by weight, preferably 0.6–4 parts by weight, more preferably 0.7–3 parts by weight per 100 parts by weight (as solid content) of the sticky resin.

The adhesive composition for formation of an adhesive layer, containing the above-mentioned sticky resin as a main component can as necessary contain, in addition to the above-mentioned ultraviolet absorber and photo-oxidation inhibitor, ordinarily added components, for example, a solvent (e.g. ethyl acetate and ethyl acetoacetate), a coloring agent (e.g. various pigments and dyes), a crosslinking agent and crosslinking accelerator. As the crosslinking agent, there can be mentioned, for example, polyisocyanate compounds, polyepoxide compounds, melamine resins and aluminum chelate compounds. As the crosslinking accelerator, there can be mentioned, for example, dibutyltin laurate.

The above-mentioned adhesive composition can be applied onto the to-be-stuck side of the fluorine-contained resin film, or onto the light-incident side surface of a base retroreflective sheeting. However, in practical application, it is preferable that the adhesive composition is beforehand applied onto the to-be-stuck side of the fluorine-contained resin film, the resulting adhesive layer is covered with a release paper or the like, and, when necessity arises, the release paper or the like is peeled and the adhesive layer is pressure-laminated on the light-incident side surface of the base retroreflective sheeting.

The above-mentioned retroreflective sheeting of the present invention is protected, at the surface, by a fluorine-contained resin film which is low in surface tension and excellent in weatherability, solvent resistance, mechanical strengths, etc. Therefore, when used in cold districts, the present retroreflective sheeting is low in extent of freezing and snow sticking on the surface; even when the surface of the present retroreflective sheeting is stained with a paint, an ink or the like, the stain can be easily removed only by wiping with dry cloth or water washing without using any organic solvent or the like. Therefore, the present retroreflective sheeting can be advantageously used in, for example, signs (e.g. road signs and construction signs), number plates on vehicles such as automobiles and motor cycles, safety goods (e.g. safety cloth and survival equipment), sporting goods (e.g. snow pole) and marking materials (e.g. signboards).

EXAMPLES

The present invention is hereinafter described more specifically by way of Examples and Comparative Examples. Incidentally, in Examples and Comparative Examples, the freezing resistance, resistance to snow sticking, retroreflecting property, flexibility and stain removability of the present retroreflective sheeting were tested and evaluated as follows.

(1) Freezing Resistance

A retroreflective sheeting is stuck on the whole surface of an aluminum plate of 7.5 cm×15 cm to obtain a test piece. This test piece is allowed to stand vertically in an atmosphere of −30° C. Water is sprayed on the whole surface of the retroreflective sheeting, and the condition of freezing on the surface after 24 hours is observed. The freezing resistance of the test piece is rated according to the following standard.

5: The frozen area is less than 5% of the total area.

4: The frozen area is 5% or more but less than 10% of the total area.

3: The frozen area is 10% or more but less than 20% of the total area.

2: The frozen area is 20% or more but less than 30% of the total area.

1: The frozen area is 30% or more of the total area.

(2) Resistance to Snow Sticking

A retroreflective sheeting is stuck on the whole surface of an aluminum plate of 1 m×1.5 m to obtain a test piece. This test piece is allowed to stand vertically outdoors during snowfall, and the condition of snow sticking on the surface after 24 hours is observed. The resistance to snow sticking of the test piece is rated according to the following standard.

5: The snow-stuck area is less than 5% of the total area.

4: The snow-stuck area is 5% or more but less than 10% of the total area.

3: The snow-stuck area is 10% or more but less than 20% of the total area.

2: The snow-stuck area is 20% or more but less than 30% of the total area.

1: The snow-stuck area is 30% or more of the total area.

(3) Retroreflecting Property

Measured according to the test method for retroreflecting property, specified by JIS Z 9117. In the measurement, the angle of view was 0.2 and the angle of incidence was 5°.

(4) Flexibility

A retroreflective sheeting is cut into a size of 10 cm×10 cm and stuck on a vinyl chloride resin-made pipe of about 5 cm in diameter at 5° C. using a pressure-sensitive adhesive provided at the back side of the cut sheeting. Fixation is made for 10 seconds.

Then, the fixation is removed and the condition of sticking of the cut sheeting on the pipe is observed.

The flexibility of the sheeting is rated according to the following standard.

3: There is no abnormality in sticking, such as lifting, peeling or the like.

2: There is abnormality in sticking, such as lifting, peeling and the like in an area(s) within 10 mm from the end of the cut sheeting.

1: There is abnormality in sticking, such as lifting, peeling and the like in an area(s) extending by more than 10 mm from the end of the cut sheeting.

(5) Stain Removability

A retroreflective sheeting is stained at the surface with an oil felt pen black and dried for 5 minutes. Thereafter, the stain removability of the sheeting is rated according to the following standard.

5: The stain can be easily wiped off by a dry cloth and no trace remains.

4: The stain can be wiped off by strong rubbing with a dry cloth and no trace remains.

3: The stain cannot be wiped off completely even by strong rubbing with a dry cloth, but can be removed by wiping with a cloth impregnated with water or ethyl alcohol and no trace remains.

2: The stain can be removed by wiping with a cloth impregnated with water or ethyl alcohol, but trace remains.

1: The stain cannot be removed even by wiping with a cloth impregnated with water or ethyl alcohol.

Example 1

A tetrafluoroethylene/ethylene copolymer fluorine-contained resin film ("Aflon COP", a product of Asahi Glass Co., Ltd.) having a thickness of about 40 μm, a total light transmittance of 92% and a surface tension of 23 dyne/cm was laminated on a pressure-sensitive adhesive layer of about 50 μm in thickness, formed on a release paper by coating, on the release paper, a mixed solution consisting of 294 parts by weight of a ethyl acetate/toluene (4/6) solution of a butyl acrylate (BA)/acrylic acid (AA) copolymer (weight ratio: BA/AA=90/10) (the solution had a solid content of 34%), 1.4 parts by weight of a benztriazole type ultraviolet absorber ["TINUVIN 328", a product of Ciba-Geigy (Japan) Limited], 0.7 part by weight of a hindered amine type photo-oxidation inhibitor ["TINUVIN 622LD", a product of Ciba-Geigy (Japan) Limited] and 0.3 part by weight of a crosslinking agent [a 1-methoxypropyl acetate-2/xylene (1/1) solution of a crosslinking agent of a hexamethylene diisocyanate derivative (the solution had a solid content of 75%], followed by drying, whereby a fluorine-contained resin film having thereon a pressure-sensitive adhesive layer was produced.

The release paper was peeled off forming on the surface of the above fluorine-contained resin film a surface of the pressure-sensitive adhesive layer. The resulting material was stuck and laminated on the light-incoming side surface of a commercial encapsulated lens retroreflective sheeting ("NIKKALITE ULS 512", a product of Nikka Polymer K. K.) as a base retroreflective sheeting to obtain a retroreflective sheeting having a surface layer made of a fluorine-contained resin film.

The thus-obtained retroreflective sheeting was measured for various properties according to the above-mentioned test methods. The results are shown in Table 1.

Example 2

A retroreflective sheeting was obtained in the same manner as in Example 1 except that the tetrafluoroethylene/ethylene copolymer film was replaced by a vinylidene fluoride resin film (PVdF) ("DX Film 14S0050", a product of Denki Kagaku Kogyo Kabushiki Kaisha) having a thickness of about 50 μm, a total light transmittance of 92% and a surface tension of 25 dyne/cm. The retroreflective sheeting was measured for various properties according to the above-mentioned test methods. The results are shown in Table 1.

Comparative Example 1

The commercial encapsulated lens retroreflective sheeting used in Example 1 was measured for various properties according to the above-mentioned test methods. The results are shown in Table 1.

Comparative Example 2

A retroreflective sheeting was obtained in the same manner as in Example 1 except that the tetrafluoroethylene/ethylene copolymer film was replaced by a polyethylene terephthalate film (PET) (Teijin Tetron S-38, a product of Teijin Limited) having a thickness of about 38 μm, a total light transmittance of 93% and a surface tension of 41 dyne/cm. The retroreflective sheeting was measured for various properties according to the above-mentioned test methods. The results are shown in Table 1.

Example 3

A retroreflective sheeting was obtained in the same manner as in Example 1 except that the encapsulated lens retroreflective sheeting was replaced by a commercial enclosed lens retroreflective sheeting ("NIKKALITE SEG 15012", a product of Nikka Polymer K. K.) as a base retroreflective sheeting. The retroreflective sheeting was measured for various properties according to the above-mentioned test methods. The results are shown in Table 1.

Comparative Example 3

The commercial enclosed lens retroreflective sheeting used in Example 3 was measured for various properties according to the above-mentioned test methods. The results are shown in Table 1.

TABLE 1

| | Item | | | | | | | | |
|---|---|---|---|---|---|---|---|---|---|
| Run No. | Retroreflecting sheeting | Film stuck | Total light transmittance (%) | Surface tension (dyne/cm) | Freezing resistance | Resistance to snow piling | Retrore-flecting property | Flexibility | Stain removability |
| Example 1 | Encapsulated lens | 4FEt-Et | 92 | 23 | 5 | 5 | 357 | 3 | 5 |
| Example 2 | " | PVdF | 92 | 25 | 5 | 4 | 352 | 2 | 4 |
| Comparative Example 1 | " | — | — | — | 1 | 1 | 357 | 3 | 1 |
| Comparative Example 2 | " | PET | 93 | 41 | 1 | 1 | 286 | 2 | 3 |
| Example 3 | Enclosed lens | 4FEt-Et | 92 | 23 | 5 | 5 | 188 | 3 | 5 |
| Comparative Example 3 | " | — | — | — | 1 | 1 | 172 | 3 | 1 |

What is claimed is:

1. A retroreflective sheeting comprising:

a base retroreflective sheeting having a flat front face layer at the light-incident side, and a fluorine-containing resin film having a total light transmittance of at least 80%, laminated on the flat front face layer of the base retroreflective sheeting via an adhesive layer;

wherein said fluorine-containing resin film has a surface tension of 40 dyne/cm or less, and comprises tetrafluoroethylene/ethylene copolymer containing 15 to 85 % by weight of tetrafluoroethylene units or polyvinylidene fluoride;

and wherein the adhesive layer comprises a pressure-sensitive adhesive, ultraviolet absorber and photo-oxidation inhibitor.

2. A retroreflective sheeting according to claim 1, wherein the fluorine-containing resin film has a total light transmittance of at least 85%.

3. A retroreflective sheeting according to claim 1, wherein said fluorine-containing resin comprises the tetrafluoroethylene/ethylene copolymer, said copolymer containing from 25 to 75% by weight of tetrafluoroethylene units.

4. A retroreflective sheeting according to claim 1, wherein the fluorine-containing resin film is produced by melt molding.

5. A retroreflective sheeting according to claim 1, wherein the fluorine-containing resin film has a thickness of 1–100 μm.

6. A retroreflective sheeting according to claim 5, wherein the fluorine-containing resin film has a thickness of 5–80 μm.

7. A retroreflective sheeting according to claim 1 wherein the pressure-sensitive adhesive is comprised mainly of an acrylic resin.

8. A retroreflective sheeting according to claim 7, wherein the acrylic resin comprises at least one $C_{2-12}$ alkyl ester of acrylic acid and at least one functional group containing acrylic monomer at a weight ratio of ester to monomer in the range of from 99.5/0.5 to 70/30, said pressure-sensitive adhesive having a glass transition temperature in the range of from −100° C. to +50° C.

9. A retroreflective sheeting according to claim 8, wherein the weight ratio of ester to monomer is from 99/1 to 75/25 and wherein the glass transition temperature of the pressure sensitive adhesive is in the range of from −80° C. to +20° C.

10. A retroreflective sheeting according to claim 1, wherein the ultraviolet absorber is a benztriazole type ultraviolet absorber.

11. A retroreflective sheeting according to claim 1, wherein the photo-oxidation inhibitor comprises hindered amine photo-oxidation inhibitor having a weight average molecular weight of 400–10,000.

12. A retroreflective sheeting according to claim 11 wherein the hindered amine photo-oxidation inhibitor has an N-substituted piperidinol nucleus.

13. A retroreflective sheeting according to claim 1, wherein the adhesive layer has a thickness of 5–80 μm.

14. A retroreflective sheeting according to claim 13, wherein the adhesive layer has a thickness of 10–70 μm.

15. A retroreflective sheeting according to claim 1 wherein the base retroreflective sheeting is an enclosed lens retroreflective sheeting.

16. A retroreflective sheeting according to claim 1 wherein the base retroreflective sheeting is an encapsulated lens retroreflective sheeting.

17. A retroreflective sheeting according to claim 1 wherein the base retroreflective sheeting is an encapsulated cube-corner retroreflective sheeting.

18. A retroreflective sheeting according to claim 1 wherein the base retroreflective sheeting is a metallized encapsulated cube-corner retroreflective sheeting.

19. A retroreflective sheeting according to claim 1, wherein the pressure-sensitive adhesive comprises a copolymer of butyl acrylate and acrylic acid in a weight ratio of from 99.1/0.9 to 70/30.

20. A retroreflective sheeting according to claim 19, wherein the weight ratio of butyl acrylate to acrylic acid is from 99.5/0.5 to 80/20.

21. A retroreflective sheeting according to claim 1, wherein the pressure-sensitive adhesive layer comprises from about 0.5 to 10 parts by weight of the ultraviolet absorber per 100 parts by weight of pressure-sensitive adhesive, and from about 0.5 to 5 parts by weight of the photo-oxidation inhibitor per 100 parts by weight of pressure-sensitive adhesive.

22. A method for improving resistance to freezing of water and sticking of snow on the light-incident side of retroreflective sheeting which may become exposed to such conditions, comprising adhering via pressure-sensitive adhesive layer, a film comprising a fluorine-containing resin selected from the group consisting of tetrafluoroethylene/ethylene copolymer and polyvinylidene fluoride and having a light transmittance of at least 80% and a surface tension of not more than 40 dyne/cm, to the light incident side of the retroreflective sheeting.

23. A method for improving stain removability of paint or ink stains on the light incident side of retroreflective sheeting which comprises adhering via pressure sensitive adhesive layer, a film comprising a fluorine-containing resin selected from the group consisting of tetrafluoroethylene/ethylene copolymer and polyvinylidene fluoride and having a light transmittance of at least 80% and a surface tension of not more than 40 dyne/cm, to the light incident side of the retroreflective sheeting, whereby paint or ink stains on the fluorine-containing resin film adhered to the light incident side of the retroreflective sheeting may be removed by wiping with a dry cloth or by water washing.

* * * * *